(12) United States Patent
Enomoto

(10) Patent No.: US 9,821,834 B2
(45) Date of Patent: Nov. 21, 2017

(54) STEERING APPARATUS AND GAS VENTILATION DEVICE

(71) Applicant: Showa Corporation, Gyoda-shi (JP)

(72) Inventor: Satoshi Enomoto, Haga-gun (JP)

(73) Assignee: SHOWA CORPORATION, Gyoda-Shi (JP)

(*) Notice: Subject to any disclaimer, the term of this patent is extended or adjusted under 35 U.S.C. 154(b) by 0 days.

(21) Appl. No.: 15/078,225

(22) Filed: Mar. 23, 2016

(65) Prior Publication Data

US 2016/0280249 A1    Sep. 29, 2016

(30) Foreign Application Priority Data

Mar. 24, 2015  (JP) ................................ 2015-061338

(51) Int. Cl.
   *B62D 5/04*     (2006.01)
   *B62D 3/12*     (2006.01)

(52) U.S. Cl.
   CPC ............ *B62D 5/0403* (2013.01); *B62D 3/12* (2013.01)

(58) Field of Classification Search
   CPC .................. B62D 5/0403; B62D 3/12
   See application file for complete search history.

(56) References Cited

U.S. PATENT DOCUMENTS

| | | |
|---|---|---|
| 3,927,576 A | 12/1975 | Colletti |
| 6,435,300 B1 | 8/2002 | Stolzenburg et al. |
| 6,500,038 B1 * | 12/2002 | Jaeger .................... B63H 21/32 123/41.08 |
| 2013/0180794 A1 * | 7/2013 | Shiino ..................... B62D 5/04 180/444 |
| 2015/0217798 A1 * | 8/2015 | Anma ..................... B62D 3/12 180/443 |

FOREIGN PATENT DOCUMENTS

| | | |
|---|---|---|
| CN | 203172712 U | 9/2013 |
| JP | 58-015575 U | 7/1981 |
| JP | 62-054066 U | 4/1987 |
| JP | 03-075353 U | 7/1991 |
| JP | 2000-318631 A | 11/2000 |
| JP | 2007145084 A * | 6/2007 |

OTHER PUBLICATIONS

U.K. Search Report dated Aug. 1, 2016 for the corresponding U.K. Patent Application No. GB1604908.2.
Office Action dated Sep. 19, 2017 for the corresponding Japanese Patent Application No. 2015-061338.

* cited by examiner

*Primary Examiner* — Kevin Hurley
(74) *Attorney, Agent, or Firm* — Leason Ellis LLP

(57) ABSTRACT

Disclosed is a motor-driven power steering apparatus including: a rack shaft that is operated by steering of a steering unit; a gear housing that accommodates the rack shaft; a tip-side opening which is formed in the gear housing, and through which an inside of the gear housing communicates with an outside of the gear housing; a gas ventilation valve that covers the tip-side opening while ensuring ventilation, through the gas ventilation valve, of a gas via the tip-side opening; and a diaphragm that is provided further inside of the gear housing than the gas ventilation valve, suppresses infiltration of a gas, which passes through the gas ventilation valve, into the gear housing, and is deformed according to a difference between an internal pressure and an external pressure of the gear housing.

10 Claims, 4 Drawing Sheets

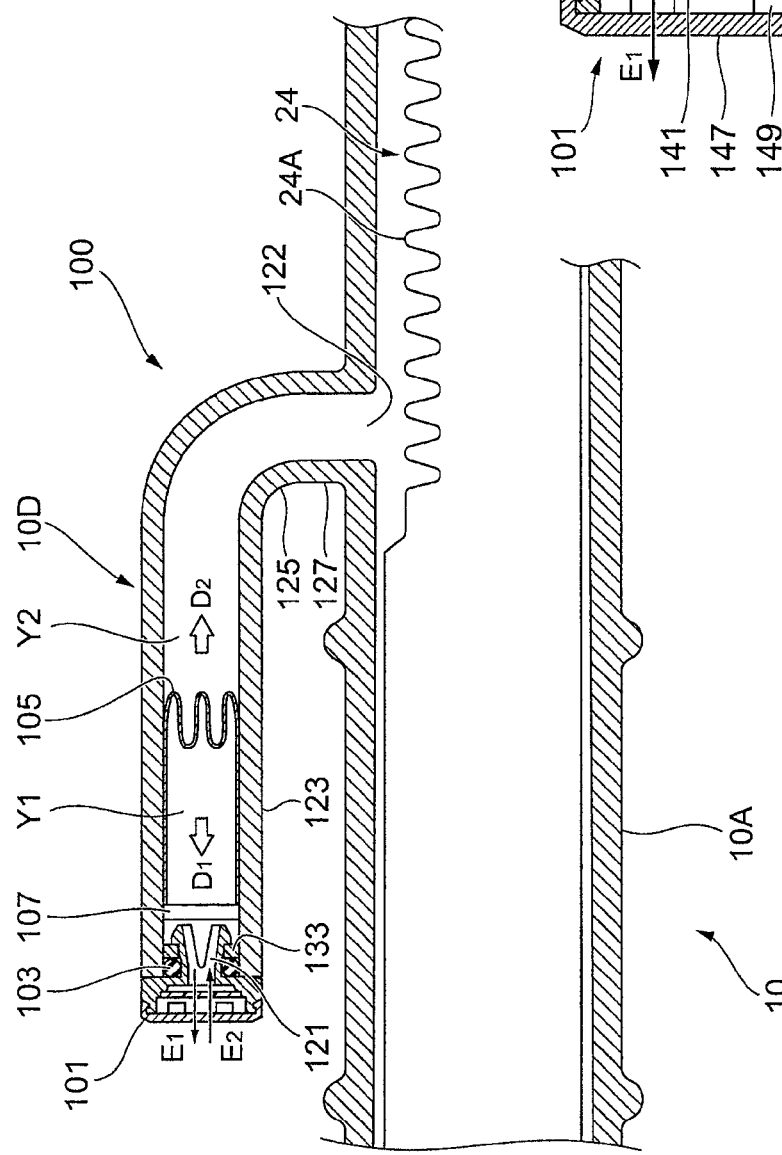
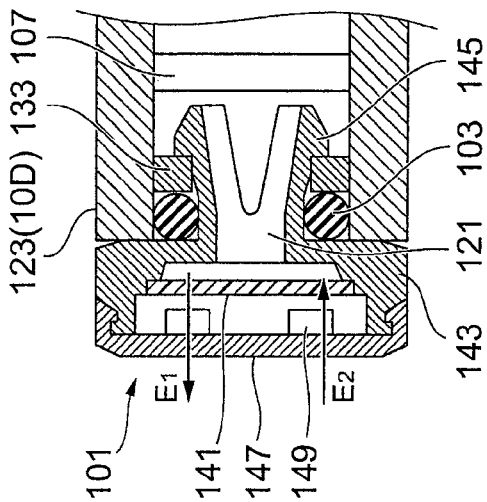
FIG. 2A
FIG. 2B

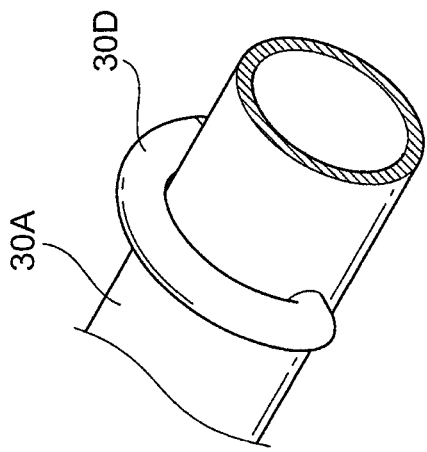
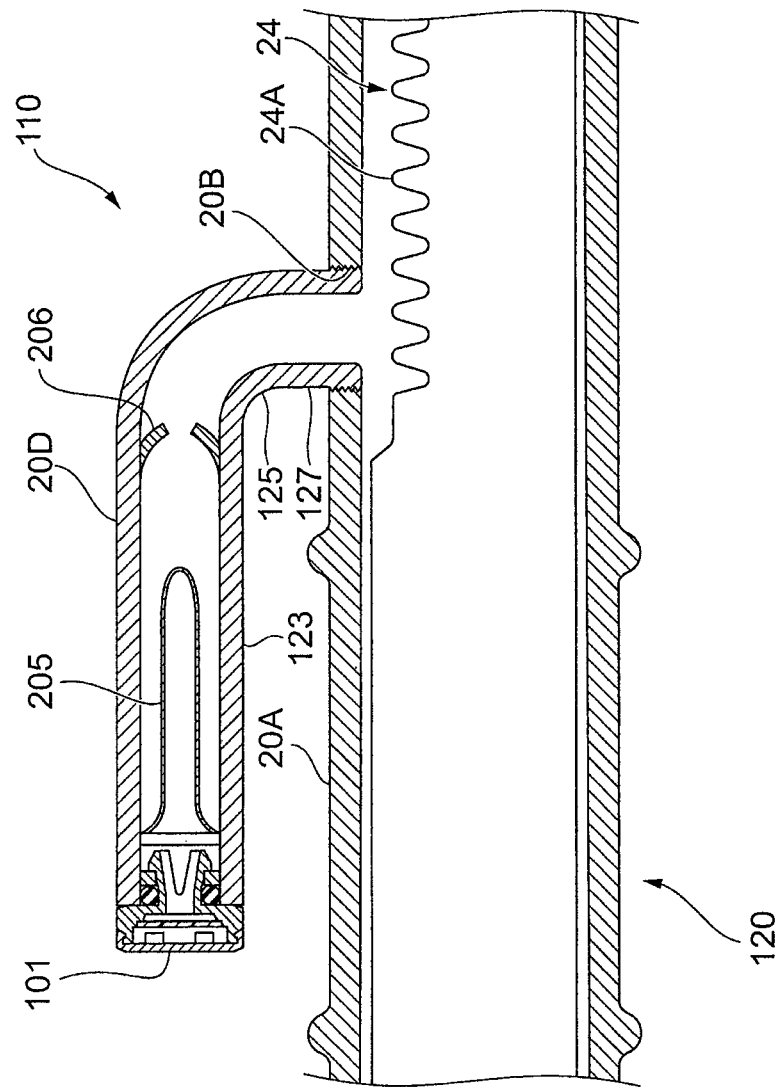

STEERING APPARATUS AND GAS VENTILATION DEVICE

CROSS-REFERENCE TO RELATED APPLICATIONS

This application claims the benefit of Japanese Patent Application JP 2015-061338, filed Mar. 24, 2015, the entire content of which is hereby incorporated by reference, the same as if set forth at length.

BACKGROUND OF THE INVENTION

1. Field of the Invention

The present invention relates to a steering apparatus and a gas ventilation device.

2. Description of Related Art

A rack and pinion type steering apparatus may be configured such that both ends of a rack shaft are respectively joined to ball and socket couplings, and both end portions and the ball and socket couplings are wrapped and sealed by expandable and contractable boots. Air in the right boot communicates with air in the left boot via a communication hole that is provided inside a rack housing, or bypassing the rack housing so as to absorb a change in the volume of air in the boots caused by the rightward and leftward movement of the rack shaft.

JP-UM-A-62-54066 discloses a rack and pinion type steering apparatus including a gas ventilation device that ventilates outside air via a communication hole. This gas ventilation device is a gas ventilation device of a rack and pinion type steering apparatus including a rack housing, a blocking element which acts like a valve and is moved in an inner space of the rack housing according to the difference between the internal pressure and the external pressure of the inner space, and a water-repellent film disposed between the space and the outside air.

SUMMARY OF THE INVENTION

In the configuration in which the water-repellent film is adopted, the infiltration of dust or water in the outside air into the rack housing can be prevented. However, humidity contained in the outside air may pass through the water-repellent film, enter the rack housing, and thus corrode (cause the occurrence of rust) inner components.

An object of the present invention is to provide a steering apparatus in which the infiltration of gas into a housing from the outside is suppressed while the internal pressure of the housing is adjusted.

According to an aspect of the present invention, there is provided a steering apparatus including: an operating body that is operated by steering of a steering unit; a housing that accommodates the operating body; an opening which is formed at the housing, and through which an inside of the housing communicates with an outside of the housing; a covering member that covers the opening while ensuring ventilation, through the covering member, of a gas via the opening; and a film membrane that is provided further inside of the housing than the covering member, suppresses infiltration of gas, which passes through the covering member, into the housing, and is deformed according to a difference between an internal pressure and an external pressure of the housing.

In the aspect, the housing may include a housing body accommodating the operating body, and a film membrane supporting body that is a hollow member having one end communicating with the housing body and other end provided with the opening, and supports the film membrane disposed in the film membrane supporting body.

In the aspect, the operating body may include a first pinion shaft that is rotated by the steering of the steering unit; a rack shaft that meshes with the first pinion shaft to move a steered unit; and a second pinion shaft that meshes with the rack shaft, and is driven by a drive unit to rotate and assist the rotation of the first pinion shaft. The housing body may include a first portion accommodating the first pinion shaft, a second portion accommodating the rack shaft, and a third portion accommodating the second pinion shaft. The film membrane supporting body may be provided on the second portion.

In the aspect, the film membrane supporting body may be provided between the first portion and the third portion in a longitudinal direction of the rack shaft accommodated in the second portion.

According to another aspect of the present invention, there is provided a steering apparatus including: an operating body that is operated by steering of a steering unit; a housing that accommodates the operating body; an opening which is formed at the housing, and through which an inside of the housing communicates with an outside of the housing; a covering member that covers the opening while ensuring ventilation, through the covering member, of a gas via the opening; and a gas ventilation suppression body that is provided further inside of the housing than the covering member, suppresses infiltration of a gas, which passes through the covering member, into the housing, and is deformed and/or is moved according to a difference between an internal pressure and an external pressure of the housing.

According to still another aspect of the present invention, there is provided a gas ventilation device that is connected to a housing accommodating an operating body which is operated by steering of a steering unit, and allows a gas to be ventilated between an inside and an outside of the housing, the device including: a first film membrane that suppresses infiltration of gas into the inside of the housing from the outside of the housing, and is deformed according to a difference between an internal pressure and an external pressure of the housing; and a second film membrane that is provided further outside of the housing than the first film membrane, and suppresses infiltration of a fluid to the first film membrane while ensuring ventilation, through the second film membrane, of a gas.

According to the present invention, it is possible to provide a steering apparatus in which the infiltration of gas into a housing from the outside is suppressed while the internal pressure of the housing is adjusted.

BRIEF DESCRIPTION OF THE DRAWINGS

FIGS. 2A and 2B are views illustrating the structure of an internal pressure adjusting unit of the motor-driven power steering apparatus in the embodiment.

FIGS. 4A and 4B are views illustrating modification examples of the internal pressure adjusting unit.

DESCRIPTION OF EMBODIMENTS

Hereinafter, an embodiment of the present invention will be described in detail with reference to the accompanying drawings.

Motor-Driven Power Steering Apparatus 1

Figure 1:
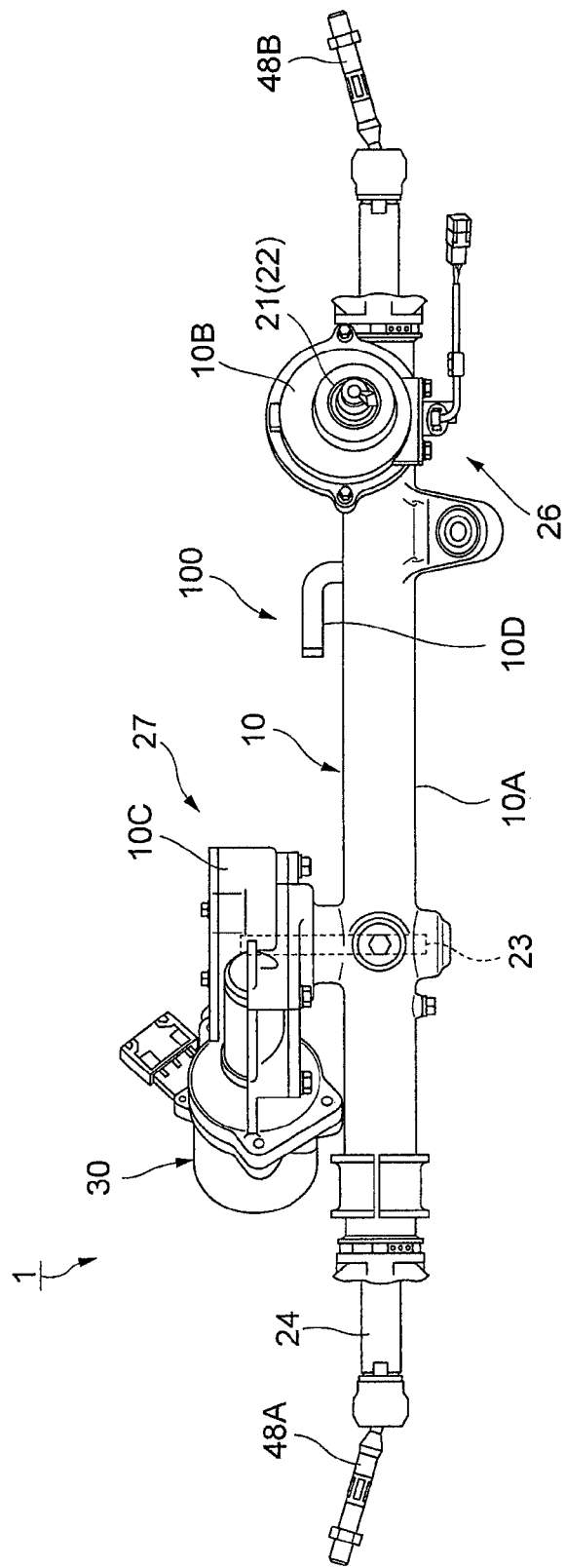
FIG. 1 is a schematic top view of a motor-driven power steering apparatus in an embodiment.

FIG. 1 is a schematic top view of a motor-driven power steering apparatus 1 in an embodiment.

As illustrated in FIG. 1, the motor-driven power steering apparatus 1 in the embodiment is a so-called double pinion-type power steering apparatus.

The motor-driven power steering apparatus 1 includes a transmission mechanism unit 26 transmitting steering force from a steering unit (steering wheel) (not illustrated) to a rack shaft (operating body) 24, and an assistance unit 27 assisting the movement of the rack shaft 24 by transmitting steering assistance force from a drive unit 30 to the rack shaft 24. The motor-driven power steering apparatus 1 in the embodiment includes a gear housing 10 accommodating the transmission mechanism unit 26 and the like, and an internal pressure adjusting unit 100 adjusting the internal pressure of the gear housing 10. The internal pressure adjusting unit 100 will be described later.

The gear housing 10, an example of a housing, is provided in such a way as to be fixed to a vehicle body frame (not illustrated) or the like. As illustrated in FIG. 1, the gear housing 10 includes a rack shaft housing 10A accommodating the rack shaft 24; a steering wheel-side gear housing 10B forming the transmission mechanism unit 26; an assistance unit-side gear housing 10C forming the assistance unit 27; and an internal pressure adjustment housing 10D forming the internal pressure adjusting unit 100.

The rack shaft housing 10A (a housing body and an example of a second portion) slidably supports the rack shaft 24. The steering wheel-side gear housing 10B, an example of a first portion, rotatably supports an input shaft 21, and a steering wheel-side pinion shaft (first pinion shaft) 22 which is an output shaft. The assistance unit-side gear housing 10C, an example of a third portion, rotatably supports an assistance unit-side pinion shaft (second pinion shaft) 23.

Right and left tie rods 48A and 48B are respectively connected to both end portions of the rack shaft 24 accommodated in the rack shaft housing 10A. The tie rods 48A and 48B are respectively connected to steered units (for example, tires) (not illustrated) via knuckle arms (not illustrated).

The motor-driven power steering apparatus 1 with the aforementioned configuration obtains steering torque of the steering wheel based on a relative rotational angle between the input shaft 21 and the steering wheel-side pinion shaft 22. The motor-driven power steering apparatus 1 controls the driving of the drive unit 30 based on the obtained steering torque. Torque generated by the drive unit 30 is transmitted to the steering wheel-side pinion shaft 22, and assists steering force applied to the steering wheel by a driver. That is, the steering wheel-side pinion shaft 22 is rotated by the steering torque generated by the rotation of the steering wheel, and the assistance torque applied from the drive unit 30.

Structure of Internal Pressure Adjusting Unit 100

FIGS. 2A and 2B are views illustrating the structure of the internal pressure adjusting unit 100 of the motor-driven power steering apparatus 1 in the embodiment. Specifically, FIG. 2A is a sectional view of the internal pressure adjusting unit 100, and FIG. 2B is an enlarged view of the vicinity of a gas ventilation valve 101.

In the following description, a longitudinal direction of the rack shaft 24 may be simply referred to as a longitudinal direction, and a circumferential direction around a center axis of the rack shaft 24 may be simply referred to as a circumferential direction.

Hereinafter, the internal pressure adjusting unit 100, an example of a gas ventilation device, will be described with reference to FIGS. 1 and 2.

As illustrated in FIG. 2, the internal pressure adjusting unit 100 includes the internal pressure adjustment housing 10D which is an example of a film membrane supporting body; the gas ventilation valve 101 provided at a tip of the internal pressure adjustment housing 10D; a seal 103 sealing the gap between the gas ventilation valve 101 and the internal pressure adjustment housing 10D; a diaphragm 105 that is deformably provided in the internal pressure adjustment housing 10D; and a support ring 107 supporting the diaphragm 105.

The internal pressure adjustment housing 10D is a hollow member having a substantially tubular shape. Openings at both ends of the internal pressure adjustment housing 10D are respectively referred to as a tip-side opening 121 and a base-side opening 122.

The internal pressure adjustment housing 10D has a substantially L shape, and includes a first straight portion 123 provided along the longitudinal direction; a bent portion 125 that is continuous with the first straight portion 123; and a second straight portion 127 connecting the bent portion 125 and the rack shaft housing 10A together.

When the internal pressure adjustment housing 10D is provided on the rack shaft housing 10A, an increase in the dimension of the surroundings of each of the steering wheel-side gear housing 10B and the assistance unit-side gear housing 10C is suppressed compared to when the internal pressure adjustment housing 10D is provided on the steering wheel-side gear housing 10B or the assistance unit-side gear housing 10C. In addition, the internal pressure adjustment housing 10D more reliably adjusts the internal pressure of the rack shaft housing 10A compared to when the internal pressure adjustment housing 10D is provided on the steering wheel-side gear housing 10B or the assistance unit-side gear housing 10C.

The internal pressure adjustment housing 10D includes a hook locking portion 133 that is provided on an inner circumferential surface of the first straight portion 123 on a tip side (the left side in FIG. 2) in such a way as to protrude from the inner circumferential surface of the first straight portion 123 to the inside in a radial direction.

The internal pressure adjustment housing 10D is formed by die-casting, and is formed integrally with the rack shaft housing 10A.

The internal pressure adjustment housing 10D is provided between the transmission mechanism unit 26 and the assistance unit in the longitudinal direction (refer to FIG. 1). More specifically, the base-side opening 122 of the internal pressure adjustment housing 10D is provided to face a passing region of a rack 24A formed in the rack shaft 24.

The tip-side opening 121 of the internal pressure adjustment housing 10D opens toward an end portion (end portion in which the tie rod 48A is provided) (refer to FIG. 1) of both end portions of the rack shaft 24, with the end portion being positioned away from the base-side opening 122.

As described above, since the internal pressure adjustment housing 10D is provided, the sticking of mud or the like splashed by tires (not illustrated) to the internal pressure adjustment housing 10D is suppressed, or the infiltration of mud or the like into the internal pressure adjustment housing 10D is suppressed.

As illustrated in FIG. 2B, the gas ventilation valve 101 (covering member and an example of a second film membrane) includes a gas ventilation film 141 covering (blocking) the tip-side opening 121 which is an example of an opening; a holding body 143 holding the gas ventilation film 141; a hook portion 145 hooked onto the hook locking portion 133; and a cover 147 covering the gas ventilation film 141.

The gas ventilation film 141 is a film-like member that suppresses the infiltration of moisture, mud, or the like into the internal pressure adjustment housing 10D from the outside while having breathability. That is, the gas ventilation film 141 is a member having breathability, waterproof properties, and dust-proof properties. A gore (trademark) membrane can be exemplified as the gas ventilation film 141. The gas ventilation film 141 allows the ventilation of gas from the inside of the internal pressure adjustment housing 10D to the outside (in a direction of arrow E1 in FIG. 2), and in a reverse direction (refer to arrow E2).

The holding body 143 is a member made of resin and having a substantially tubular shape. The holding body 143 holds the gas ventilation film 141 therein in a direction perpendicular to the center axis of the internal pressure adjustment housing 10D. The holding body 143 has a gas ventilation region 149 (flow path of gas) between the cover 147 and the holding body 143.

The hook portion 145 is a member that is made of resin and is formed integrally with the holding body 143. The hook portion 145 is elastically deformed, and is hooked onto the hook locking portion 133 such that the position of the gas ventilation valve 101 is fixed. The hook portion 145 is disposed away from the support ring 107 when being hooked onto the hook locking portion 133. In other words, the support ring 107 is provided at a position in which the support ring 107 is not in contact with the hook portion 145.

The cover 147 is a member made of resin and having a substantially circular plate shape, and covers the gas ventilation film 141 while being positioned away from the gas ventilation film 141 by a predetermined distance. The cover 147 suppresses collision of small stones or the like with the gas ventilation film 141, and thus suppresses damage to the gas ventilation film 141.

Hereinafter, the seal 103 will be described. The seal 103 is an elastic member provided between the inner circumferential surface of the internal pressure adjustment housing 10D and an outer circumferential surface of the holding body 143 of the gas ventilation valve 101. For example, the seal 103 is an O-ring. When the hook portion 145 of the gas ventilation valve 101 is hooked onto the hook locking portion 133, the seal 103 seals the gap between the inner circumferential surface of the internal pressure adjustment housing 10D and an outer circumferential surface of the holding body 143.

Hereinafter, the diaphragm 105 will be described with reference to FIG. 2A. The diaphragm 105 (an example of a film membrane, a gas ventilation suppression, and a first film membrane) is a deformable film membrane. The diaphragm 105 is made of rubber such as natural rubber, polytetrafluoroethylene (PTFE), and ethylene-propylene rubber (EPR), resin, metal, or the like. The diaphragm 105 is molded into a film shape with any one of these materials, and is provided.

The diaphragm 105 limits the passing through of gas. More specifically, the diaphragm 105 has breathability lower than (it is difficult for gas to pass through the diaphragm 105) the gas ventilation film 141. The diaphragm 105 partitions the inner space of the internal pressure adjustment housing 10D into a first chamber Y1 positioned on the tip side of the internal pressure adjustment housing 10D, and a second chamber Y2 positioned on the base side of the internal pressure adjustment housing 10D.

In the following description, the deformation of the diaphragm 105 to increase the inner volume of the first chamber Y1 (to decrease the volume of the second chamber Y2), in other words, the expansion (or extension) of the diaphragm 105 may be simply referred to as expansion. The deformation of the diaphragm 105 to decrease the inner volume of the first chamber Y1 (to increase the volume of the second chamber Y2), in other words, the contraction (or loosing) of the diaphragm 105 may be simply referred to as contraction.

The diaphragm 105 is deformably provided to be positioned further inward than the gas ventilation valve 101.

The diaphragm 105 is expanded or is contracted in the internal pressure adjustment housing 10D according to a relationship between the internal gas pressure and the external gas pressure of the gear housing 10, which will be described in detail later.

The support ring 107 is a member made of metal, resin, or the like and having a substantially annular shape. The support ring 107 supports the diaphragm 105 interposed between an outer circumferential surface of the support ring 107 and the inner circumferential surface of the internal pressure adjustment housing 10D.

Operation of Internal Pressure Adjusting Unit 100

Figure 3A:
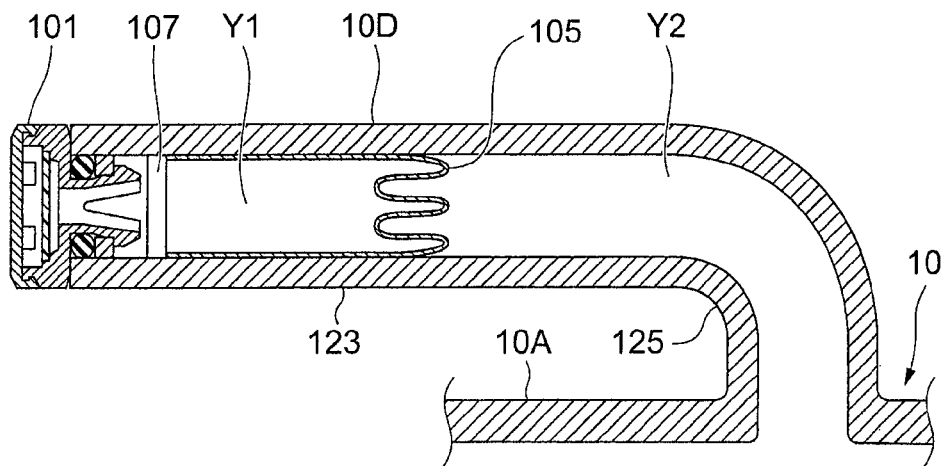
FIGS. 3A, 3B and 3C are views illustrating the operation of the internal pressure adjusting unit.
Figure 3B:
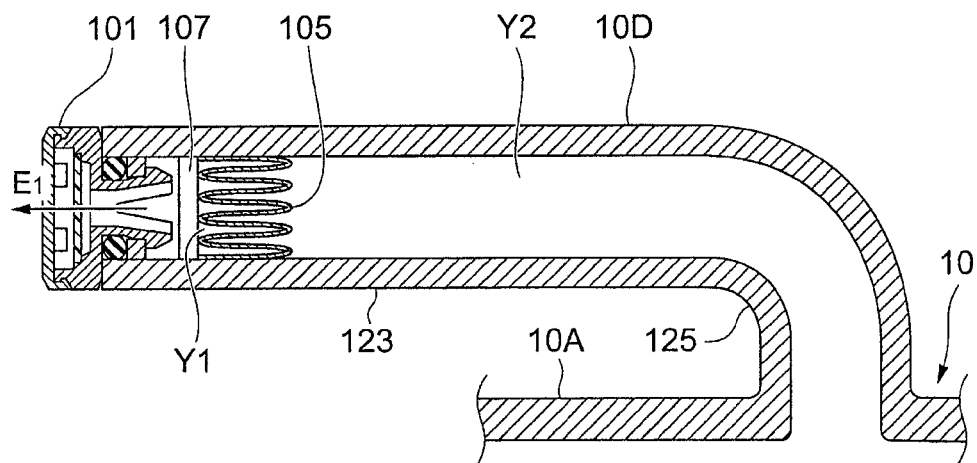
Figure 3C:
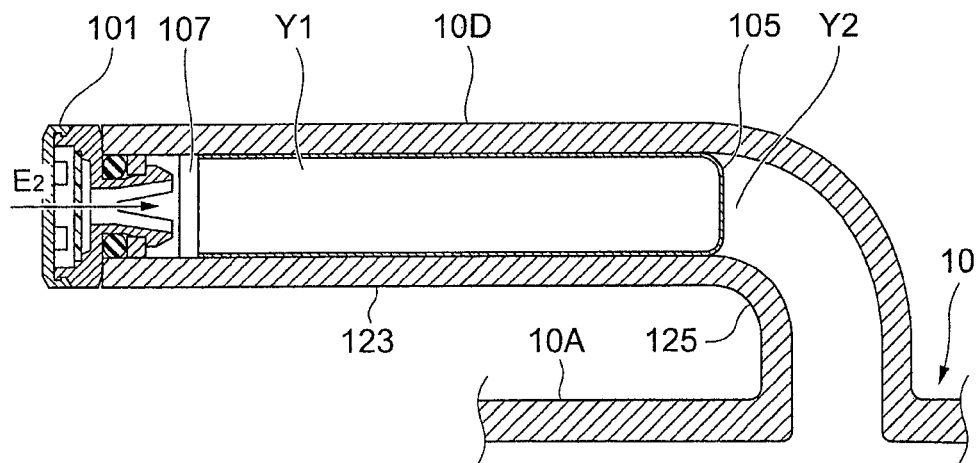

FIGS. 3A to 3C are views illustrating the operation of the internal pressure adjusting unit 100. More specifically, FIG. 3A illustrates a state in which the rack shaft housing 10A has a normal internal pressure, FIG. 3B illustrates a state in which the internal pressure adjustment housing 10D has a high internal pressure, and FIG. 3C illustrates a state in which the internal pressure adjustment housing 10D has a low internal pressure. For the purpose of simplicity, the external pressure of the gear housing 10 is assumed to be constant.

First, as illustrated in FIG. 3A, when the rack shaft housing 10A of the gear housing 10 has the normal internal pressure, the diaphragm 105 is deemed to be in a normal state. The diaphragm 105 in a normal state can be expanded or contracted. In the illustrated example, a portion of the diaphragm 105 is loose.

Subsequently, as illustrated in FIG. 3B, when the internal pressure of the rack shaft housing 10A of the gear housing 10 is higher than the normal pressure illustrated in FIG. 3A, that is, the internal pressure is increased, the diaphragm 105 is contracted than in the normal state. In the illustrated example, the entirety of the diaphragm 105 is looser.

As illustrated in FIG. 3B, when the diaphragm 105 is contracted, and the inner space of the second chamber Y2 is increased, the internal pressure of the rack shaft housing 10A continuous with the second chamber Y2 is decreased. Along with the contraction of the diaphragm 105, gas flows from the inside of the internal pressure adjustment housing 10D to the outside (in the direction of arrow E1 in FIG. 3B) via the gas ventilation valve 101.

Subsequently, as illustrated in FIG. 3C, when the internal pressure of the rack shaft housing 10A of the gear housing 10 is lower than the normal pressure illustrated in FIG. 3A, that is, the internal pressure is decreased, the diaphragm 105 is further expanded than in the normal state. In the illustrated example, the entirety of the diaphragm 105 is extended.

As illustrated in FIG. 3C, when the diaphragm 105 is expanded, and the inner space of the second chamber Y2 is decreased, the internal pressure of the rack shaft housing 10A continuous with the second chamber Y2 is increased. Along with the expansion of the diaphragm 105, gas flows to the inside of the internal pressure adjustment housing 10D from the outside (in the direction of arrow E2 in FIG. 3C) via the gas ventilation valve 101.

In the internal pressure adjusting unit 100 with the aforementioned configuration, the gas ventilation valve 101 suppresses the infiltration of scattering objects (for example, moisture, mud, and dust) into the internal pressure adjustment housing 10D from the outside. The gas ventilation film 141 (refer to FIG. 2B) of the gas ventilation valve 101 has both waterproofing properties and breathability. Accordingly, for example, high humidity air may pass through the gas ventilation film 141 (the gas ventilation valve 101). When high humidity air infiltrates into the rack shaft housing 10A, the rack shaft 24 may be corroded.

In the embodiment, since the diaphragm 105 is provided, the infiltration of gas (passing through the gas ventilation valve 101) into the rack shaft housing 10A is suppressed. As a result, it is possible to reduce the possibility that the internal humidity of the rack shaft housing 10A is increased and the rack shaft 24 is corroded. Additionally, the internal humidity of the rack shaft housing 10A is stabilized (is maintained constant) by providing the diaphragm 105. The number of objects flowing into the rack shaft housing 10A (or flowing out of the rack shaft housing 10A) is reduced (is zero), and the impact of external factors on inner components disposed in the rack shaft housing 10A is suppressed.

Since the diaphragm 105 is deformed in the internal pressure adjustment housing 10D, a change in the internal pressure of the gear housing 10 is suppressed. Specifically, for example, since the diaphragm 105 is contracted to the extent that air in the gear housing 10 is warmed up and expanded by the steering of the steering unit (not illustrated), the difference between the internal pressure and the external pressure of the gear housing 10 is adjusted. Even if the motor-driven power steering apparatus 1 is used in severe environments, for example, at a high altitude in which air pressure is low, and ambient temperature is high, since the diaphragm 105 is deformed (contracted), air in the first chamber Y1 of the internal pressure adjustment housing 10D can be discharged to the outside via the gas ventilation valve 101.

As illustrated in FIG. 1, the internal pressure adjustment housing 10D is continuous with the entire inside of the gear housing 10. The inside of the gear housing 10 is continuous with the insides of dust boots (not illustrated) provided on both end portions of the rack shaft 24, though not described above.

For example, when the internal pressure adjusting unit 100 is not provided unlike the embodiment, and the motor-driven power steering apparatus 1 is used in the aforementioned low-pressure and high-temperature environments, it is deemed that the volume of air in the gear housing 10 and the dust boots is increased, and the dust boots are expanded. The expanded dust boots may apply resistance force to the movement of the rack shaft 24. In contrast, in the embodiment, since the diaphragm 105 of the internal pressure adjusting unit 100 is deformed (contracted), the application of resistance force to the rack shaft 24 by the expanded dust boots is limited.

In the example illustrated in FIG. 3B, even if the internal pressure of the internal pressure adjustment housing 10D is high, and the diaphragm 105 is contracted, the movement of the diaphragm 105 is limited by the support ring 107, and the diaphragm 105 is not brought into contact with the gas ventilation valve 101. As a result, the placement of the gas ventilation valve 101 out of its original position due to the deformation of the diaphragm 105 is suppressed.

As in the example illustrated in FIG. 3C, the diaphragm 105 is configured to have a dimension such that the diaphragm 105 does not protrude to the inside of the rack shaft housing 10A from the inside of the internal pressure adjustment housing 10D even if the internal pressure of the internal pressure adjustment housing 10D is low. More specifically, a tip of the diaphragm 105 does not reach the bent portion 125.

That is, a region, in which the diaphragm 105 is deformed and stretched, does not overlap with a movement region of the rack shaft 24. As a result, contact between the diaphragm 105 and the rack shaft 24 is avoided, in other words, a limitation to the operation of one of the diaphragm 105 and the rack shaft 24 set by the other is avoided.

In the illustrated example, since the gas ventilation valve 101 is provided at the tip of the internal pressure adjustment housing 10D, the infiltration of scattering objects (for example, moisture, mud, and dust) into the internal pressure adjustment housing 10D, leading to a hindrance to the deformation of the diaphragm 105 is suppressed.

Modification Examples

FIGS. 4A and 4B are views illustrating modification examples of the internal pressure adjusting unit 100.

In the following description, the same reference signs will be assigned to the same portions in the internal pressure adjusting unit 100 illustrated in FIGS. 2A and 2B, and detailed description thereof will be omitted.

As illustrated in FIG. 2A, the internal pressure adjustment housing 10D is formed integrally with the rack shaft housing 10A; however, the present invention is not limited to that configuration. For example, as illustrated in FIG. 4A, screw grooves (male screw) may be formed in an outer circumference of a base-side end portion of an internal pressure adjustment housing 20D of an internal pressure adjusting unit 110, and screw grooves (female screw) meshing with (being engaged with) the male screw may be formed in an inner circumference of a through hole 20B formed in a rack shaft housing 20A. The internal pressure adjusting unit 110 is an example of a gas ventilation device.

As a result, it is possible to form a gear housing 120 by assembling the rack shaft housing 20A and the internal pressure adjustment housing 20D (which are independently formed) together. It is easy to insert inner components such as the diaphragm 105 into the internal pressure adjustment housing 20D.

In the aforementioned description, the diaphragm 105 is loose or extended; however, the present invention is not limited to that configuration insofar as the diaphragm 105 can be deformed along with the difference between the internal pressure and the external pressure of the gear housing 10. For example, as illustrated in FIG. 4A, a diaphragm 205 may be deformed in a way other than being loose.

As illustrated in FIG. 4A, the internal pressure adjustment housing 20D may include a stopper 206 suppressing excessive deformation and stretching of the diaphragm 105. The stopper 206 is provided to protrude from an inner circumferential surface of the first straight portion 123 to the inside in the radial direction. A surface of the stopper 206 on a tip side (left side in FIG. 4A) of the internal pressure adjustment housing 20D is bent to support the tip of the diaphragm 105. The diaphragm 105 is expanded and the tip of the diaphragm 105 is brought into contact with the stopper 206 such that the protruding of the diaphragm 105 into the rack shaft housing 10A is suppressed.

As illustrated in FIG. 2A, the internal pressure adjustment housing 10D includes the first straight portion 123 provided along the longitudinal direction; however, the present invention is not limited to that configuration. For example, as illustrated in FIG. 4B, an internal pressure adjustment housing 30D may be formed along an outer circumference of a rack shaft housing 30A. That is, the internal pressure adjustment housing 30D may be configured to extend in the circumferential direction. The internal pressure adjustment housing 10D may be formed on another portion (arbitrary region) (the steering wheel-side gear housing 10B or the assistance unit-side gear housing 10C) of the gear housing 10, though not shown in the drawing.

In the embodiment, the internal pressure adjusting unit 100 includes the diaphragm 105; however, the present invention is not limited to that configuration. The internal pressure adjusting unit 100 may adopt another configuration such that the infiltration of gas (passing through the gas ventilation valve 101) into the rack shaft housing 10A is suppressed (blocked), and an operation and/or deformation are made according to the difference between the internal pressure and the external pressure of the gear housing 10 to suppress the pressure difference.

A piston (not illustrated) may be provided to partition the inner space of the internal pressure adjustment housing 10D into the first chamber Y1 and the second chamber Y2, and to move in the internal pressure adjustment housing 10D according to a change in the internal pressure of the gear housing 10. Alternatively, a diaphragm (not illustrated) may be provided to move in the internal pressure adjustment housing 10D, and to be deformed according to a change in the internal pressure of the gear housing 10.

In the aforementioned description, the hook portion 145 of the gas ventilation valve 101 is hooked onto the hook locking portion 133 such that the gas ventilation valve 101 is fixed; however, the present invention is not limited to that configuration. The gas ventilation valve 101 may be fixed by well-known fixing method such as bonding, welding, and screw-in.

Various modification examples have been described, and the present invention may be realized by combinations of these modification examples.

This disclosure is not limited to this embodiment, and can be realized in various forms insofar as the forms do not depart from the purport of this disclosure.

What is claimed is:

1. A steering apparatus comprising:
an operating body that is operated by steering of a steering unit;
a housing that accommodates the operating body;
an opening which is formed at the housing, and through which an inside of the housing communicates with an outside of the housing;
a covering member that covers the opening while ensuring ventilation, through the covering member, of a gas via the opening; and
a film membrane that is provided inside the housing so as to be further inside than the covering member and suppresses infiltration of a gas, which passes through the covering member, into the housing, wherein
a hollow portion is formed by an inner surface of the covering member and an inner surface of the film membrane.

2. The steering apparatus according to claim 1,
wherein the housing comprises: a housing body accommodating the operating body; and a film membrane supporting body that is a hollow member having one end communicating with the housing body and other end provided with the opening, and supports the film membrane disposed in the film membrane supporting body.

3. The steering apparatus according to claim 2,
wherein the operating body comprises: a first pinion shaft that is rotated by the steering of the steering unit; a rack shaft that meshes with the first pinion shaft to move a steered unit; and a second pinion shaft that meshes with the rack shaft, and is driven by a drive unit to rotate and assist the rotation of the first pinion shaft,
wherein the housing body comprises a first portion accommodating the first pinion shaft, a second portion accommodating the rack shaft, and a third portion accommodating the second pinion shaft, and
wherein the film membrane supporting body is provided on the second portion.

4. The steering apparatus according to claim 3,
wherein the film membrane supporting body is provided between the first portion and the third portion in a longitudinal direction of the rack shaft accommodated in the second portion.

5. The steering apparatus according to claim 1, wherein the hollow portion changes its volume according to a difference between an internal pressure and an external pressure of the housing.

6. The steering apparatus according to claim 1, wherein when the film membrane expands into the housing, a volume of the hollow portion increases.

7. The steering apparatus according to claim 1, wherein an outer surface of the film membrane abuts an inner surface of the housing.

8. A steering apparatus comprising:
an operating body that is operated by steering of a steering unit;
a housing that accommodates the operating body;
an opening which is formed at the housing, and through which an inside of the housing communicates with an outside of the housing;
a covering member that covers the opening while ensuring ventilation, through the covering member, of a gas via the opening; and
a film membrane that is provided inside the housing so as to be further inside than the covering member and suppresses infiltration of a gas, which passes through the covering member, into the housing, wherein
a hollow portion is formed by an inner surface of the covering member and an inner surface of the film membrane, and
the film membrane is deformed or is moved according to a difference between an internal pressure and an external pressure of the housing.

9. The steering apparatus according to claim 8, wherein the film membrane is deformed and moved according to the difference between the internal pressure and the external pressure of the housing.

10. A gas ventilation device that is connected to a housing accommodating an operating body which is operated by steering of a steering unit, and allows a gas to be ventilated between an inside and an outside of the housing, the device comprising:
a first film membrane that suppresses infiltration of a gas into the inside of the housing from the outside of the housing, and is deformed according to a difference between an internal pressure and an external pressure of the housing; and
a second film membrane that is provided further outside of the housing than the first film membrane, and suppresses infiltration of a fluid to the first film membrane while ensuring ventilation, through the second film membrane, of a gas.

\* \* \* \* \*